No. 743,103. Patented November 3, 1903.

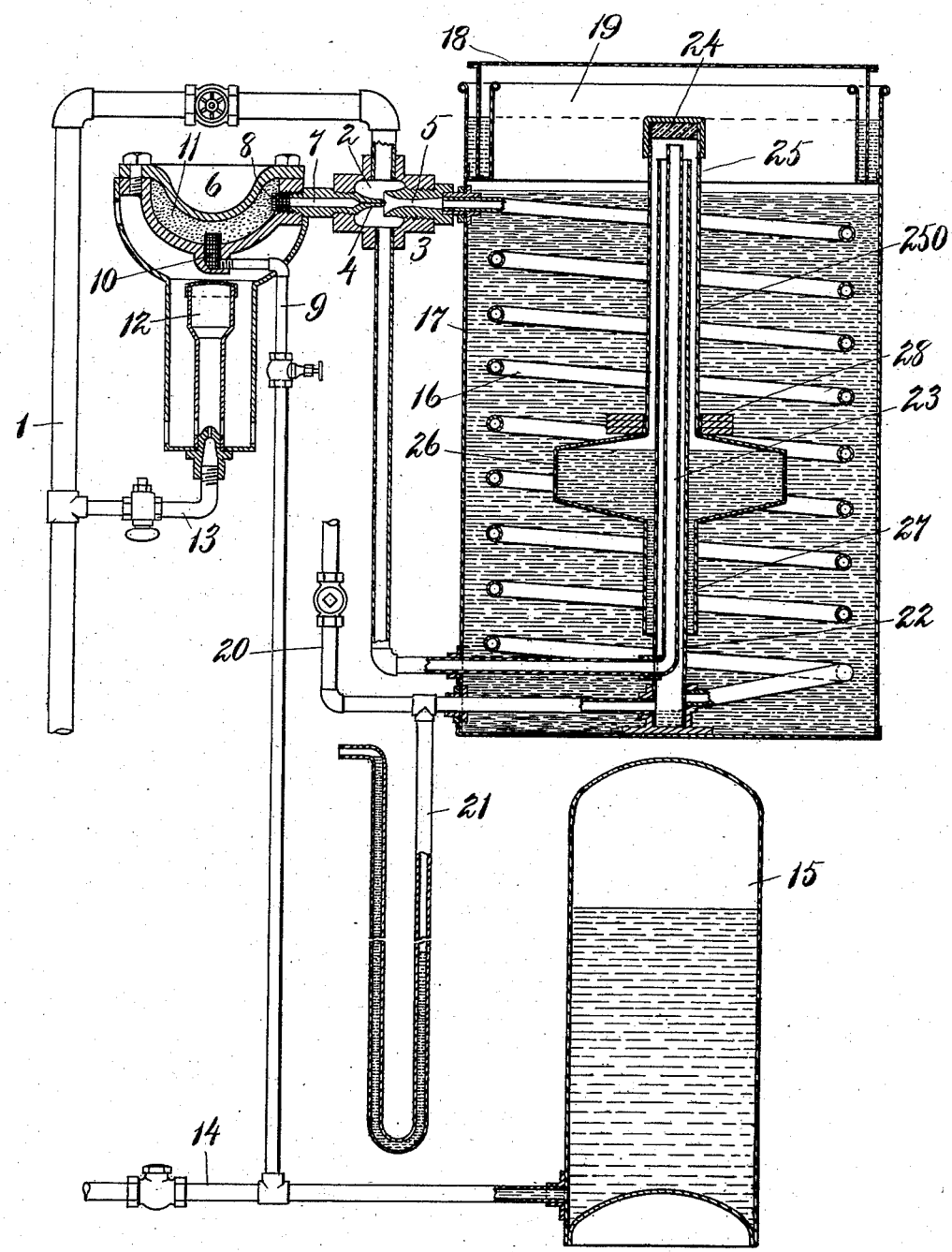

UNITED STATES PATENT OFFICE.

FOREST A. RAY, OF BOSTON, MASSACHUSETTS, ASSIGNOR TO THE STANDARD LIGHT COMPANY, OF BOSTON, MASSACHUSETTS, A CORPORATION OF MAINE.

APPARATUS FOR INCREASING AND REGULATING GAS-PRESSURE.

SPECIFICATION forming part of Letters Patent No. 743,103, dated November 3, 1903.

Application filed December 21, 1901. Serial No. 86,756. (No model.)

*To all whom it may concern:*

Be it known that I, FOREST A. RAY, of Boston, in the county of Suffolk and State of Massachusetts, have invented certain new and useful Improvements in Apparatus for Increasing and Regulating Gas-Pressure, of which the following is a specification.

This invention has for its object the provision of improved means for increasing and regulating the pressure of a gas, such as ordinary illuminating-gas supplied by street-mains, whereby gas-burners may be operated at an increased pressure. Heretofore the pressure has been increased by employing piston-pumps with various forms of regulating apparatus designed to maintain a uniform pressure of the output during variations in the demand therefor; but the objections to such methods have been their high initial cost and cost of operation and the difficulty of securing satisfactory regulation. My invention overcomes these objections in a marked degree and provides a simple, safe, and inexpensive apparatus capable of delicate regulation of the pressure of the output.

The accompanying drawing represents a view, mainly in vertical section, of an apparatus constructed in accordance with my invention.

1 represents a gas-supply pipe connected to the suction-chamber 2 of an ejector 3, having a jet-forming nozzle 4 and a combining or mixing tube 5.

6 is a steam-generator having an outlet-pipe 7, leading to the ejector-nozzle 4 and protected by a strainer 8, and an inlet-pipe 9, protected by a strainer 10. The steam-generator contains granular material 11, such as comminuted carbon, to increase the vaporizing-surface and is heated by a gas-burner 12, which derives gas through a pipe 13, branching from the gas-pipe 1.

Any suitable form of steam-generator and any suitable means for heating it may be substituted for those shown.

The pipe 9 is connected with a water-supply pipe 14, leading from a street-main or other source of supply, carrying a pressure suited to maintain the desired steam-pressure. An air-chamber 15 is employed for equalizing the pressure variations or pulsations which may occur in the water-supply. This chamber also has the effect of an automatic regulator, for should the steam-pressure rise above that corresponding to the water-main pressure received through pipe 14 the water in the generator 6 will be forced out therefrom and backed up through the pipe 20 into the chamber 15 against the pressure of the air in said chamber. The generation of steam then diminishes or ceases until the pressure has been restored to normal.

The mixing-tube 5 of the ejector connects with a condensing-coil 16, immersed in water contained in a vessel 17, which is cooled by radiation to the atmosphere, said vessel being sealed by a cover 18, whose edges enter a sealing liquid contained in an annular trough 19, whereby disagreeable odors, due to the impregnation of the cooling liquid by the gas, are prevented from escaping.

20 is a delivery-pipe leading from the lower end of the condensing-coil 16 and having connected to it at its lowest point a U-tube 21, open at its outer end.

The coil 16 and delivery-pipe 20 are jointed into a vertical pipe 22, open at its upper end above the water-level in the tank 17. This pipe surrounds a by-pass pipe 23, which projects above the upper end of the pipe 22 and extending outside of the vessel 17 is connected to the suction-chamber 2 of the ejector 3. The inlet end of the by-pass pipe 23 is controlled by a valve 24, carried by a float 250, composed of a narrow upper portion 25, an intermediate chamber 26 of enlarged diameter and capacity, and a lower narrow portion 27, open at its lower end. The float is weighted with a suitable number of weights 28, according to the pressure which it is desired to maintain.

The operation is as follows: The steam created in generator 11 is projected through the nozzle 4 in the form of a jet into the mixing-tube 5 and entrains with it a large relative quantity of gas supplied through the pipe 1, thereby considerably raising the pressure of the gas delivered from the mixing-tube. The ejector operates after the ordinary manner of apparatus of this kind by the momentum of the propelling-jet acting frictionally against the ejected or propelled fluid. The mixed gas and steam pass into the condensing-coil 16, where the steam, whose presence would be objectionable in the fluid which is to pass to the burners, is condensed into water and falls into the U-tube 21, where it accumulates and escapes through the open end of said tube, said tube therefore constituting a trap for the escape of the water of condensation. The gas is delivered to the pipe 20 free, or substantially so, from steam. The valve 24 is designed to remain closed so long as a normal or a considerable output of gas is being utilized, the water inside of the float 250 being pressed a certain distance below the water-level in the main body of the tank 17. Upon the attainment of a certain predetermined pressure for which the apparatus is designed and regulated the water-level inside of the float sinks below the top of chamber 26, and the gas then exerts a greatly-increased lifting power, owing to the larger area of the float, on which it acts upwardly and causes the valve 24 to open. More or less of the gas is then by-passed and returned to the suction side of the ejector 3, through which it again passes in a circuit.

My apparatus is designed so that it will operate properly under wide variations in pressure—for instance, there are times when it is desirable to send the gas through the apparatus at ordinary street-pressure without the assistance of the forcing steam-jet. To enable this to be done, it is necessary to provide against any obstructive accumulations of liquid in the apparatus which might prevent or greatly diminish the flow of the low-pressure gas, and this I do by avoiding pockets capable of catching and holding the water of condensation in the path of the gas. All such water drains to the bottom of the condenser and is there carried off by the trap, which I locate for this purpose below the lowest level of the condenser.

I claim—

1. In an apparatus for raising gas-pressure, the combination of jet-forming means, a steam-generator connected therewith, jet and gas mixing means, a condenser, a normally unobstructed gas-passage through said condenser arranged to receive the mixed gas and steam, and means for automatically returning the gas from the delivery end of said condenser to the suction side of the jet and gas mixing means upon the attainment of a predetermined pressure of said gas.

2. In an apparatus for raising gas-pressure, the combination of jet-forming means, a steam-generator connected therewith, jet and gas mixing means, a condenser comprising a solid condensing-surface arranged in the form of a normally unobstructed elongated sinuous passage for the steam and gas, means for maintaining a supply of condensing liquid in contact with said surface, and means for returning an excess of gas from the outlet of the condenser to the entrance end thereof.

3. In an apparatus for raising gas-pressure, the combination of jet-forming means, a steam-generator connected therewith, jet and gas mixing means, a normally unobstructed elongated sinuous condensing course connected with said mixing means and having a gas-outlet, and means controlled by the gas-pressure in said course for automatically returning the gas from the delivery end thereof to the suction side of the jet and gas mixing means.

4. In an apparatus for raising gas-pressure, the combination of jet-forming means, a steam-generator connected therewith, jet and gas mixing means, a condenser connected with said mixing means and having a gas-outlet, a by-pass leading from the outlet end of said condenser to the suction side of said jet and gas mixing means, a liquid-container, and a bell-float in said container receiving the gas-pressure on its inside and having a valve controlling said by-pass, said float being formed with a narrow upper portion and a wide lower portion, for the purpose set forth.

5. In an apparatus for raising gas-pressure, the combination of jet-forming means, a steam-generator connected therewith, jet and gas mixing means, a condenser connected with said jet and gas mixing means and having a gas-outlet, means to supply feed-water directly and continuously by its own pressure to the lower part of said generator, and a regulator additional to said water-feeding means comprising a chamber in open branch connection with the generator and having a closed air-pocket.

In testimony whereof I have affixed my signature in presence of two witnesses.

FOREST A. RAY.

Witnesses:
R. M. PIERSON,
GEORGE PEZZITTI.